(12) United States Patent
Larsen

(10) Patent No.: US 6,467,183 B2
(45) Date of Patent: Oct. 22, 2002

(54) FRACTIONAL-DECIMAL VERNIER

(76) Inventor: Richard D. Larsen, 451 Taft St., Minneapolis, MN (US) 55413

( * ) Notice: Subject to any disclaimer, the term of this patent is extended or adjusted under 35 U.S.C. 154(b) by 10 days.

(21) Appl. No.: 09/816,959

(22) Filed: Mar. 24, 2001

(65) Prior Publication Data

US 2001/0013179 A1 Aug. 16, 2001

Related U.S. Application Data

(63) Continuation-in-part of application No. 09/259,895, filed on Feb. 27, 1999, now Pat. No. 6,205,673.

(51) Int. Cl.$^7$ .................................................. G01B 5/14
(52) U.S. Cl. ......................................... 33/810; 33/679.1
(58) Field of Search ............................... 33/1 D, 1 SB, 33/542, 810, 811, 812, 830, 679.1, 783

(56) References Cited

U.S. PATENT DOCUMENTS

| | | |
|---|---|---|
| 442,020 A | 12/1890 | Darling |
| 750,204 A | 1/1904 | Lachmann |
| 897,437 A | 9/1908 | Watson |
| 1,321,567 A | 11/1919 | Spindler |
| 1,329,729 A | 2/1920 | Swartz |
| 1,341,865 A | 6/1920 | Solberg |
| 1,602,490 A | 10/1926 | Homan |
| 1,888,305 A | 11/1932 | Berger |
| 1,888,597 A | 11/1932 | Huffman |
| 1,969,624 A | 8/1934 | Salzbrenner |
| 2,304,265 A | 12/1942 | Magyari |
| 2,474,248 A | 6/1949 | Henry et al. |
| 2,502,039 A | 3/1950 | Floyd |
| 2,908,979 A | 10/1959 | Backman |
| D195,356 S | 6/1963 | Keszler |
| 3,177,588 A | 4/1965 | Sorensen |
| 3,449,052 A | 6/1969 | Rankin |
| 3,533,165 A | 10/1970 | Larsen |
| 4,607,436 A | 8/1986 | Clay |
| 5,084,982 A | 2/1992 | Feng |
| 5,313,715 A | 5/1994 | Wang |
| 6,205,673 B1 * | 3/2001 | Larsen et al. ............... 33/679.1 |

FOREIGN PATENT DOCUMENTS

| | | |
|---|---|---|
| CA | 908418 | 8/1972 |
| FR | 475353 | 5/1915 |
| FR | 1437948 A | 3/1966 |
| FR | 2604250 | 3/1988 |
| GB | 103555 | 2/1917 |
| GB | 560474 | 4/1944 |
| GB | 761190 | 11/1956 |

* cited by examiner

*Primary Examiner*—G. Bradley Bennett
(74) *Attorney, Agent, or Firm*—Albert W. Watkins

(57) ABSTRACT

An attachment to a standard measuring rule includes a body securely supporting the measuring rule. Within the body a vernier is provided. The vernier divides twenty-four one-eighth inch divisions into twenty-five equal parts, enabling vernier measurements in units of five-thousandths of an inch. A second vernier with marks spaced by one thousandth of a unit less than said measuring rule enables resolution to thousandth units. The results of the first and second verniers can be summed to yield non-interpolated resolution in thousandths of an inch from a fractional rule. Replacement rules and verniers further enable the measuring instrument to alternatively measure tolerance limits, providing the measuring instrument the adaptability to be converted readily into an easy to read quality control instrument.

16 Claims, 8 Drawing Sheets

FRACTIONAL-DECIMAL VERNIER

CROSS REFERENCE TO RELATED APPLICATIONS

This application is a continuation-in-part of application Ser. No. 09/259,895, filed Feb. 27, 1999 now U.S. Pat. No. 6,205,673 issued on Mar. 27, 2001, the contents which are incorporated herein by reference.

BACKGROUND OF THE INVENTION

1. Field of the Invention

This invention pertains generally to geometrical instruments, and more specifically to straight-edge rules that include an index for subdividing the scale, commonly referred to as a vernier.

2. Description of the Related Art

Devices for measuring distances and geometries of objects are quite old, dating back to prehistoric times. The early devices were designed to measure using units associated with commonly available objects, such as forearms, hands and feet. Distances were generally defined in whole units and fractions were used only infrequently, being more difficult to calculate and determine. Commonly available objects were identified that could be used for smaller and larger measurements, which reduced the need for fractions or large values. Eventually, whole unit measurements gave way to fractional divisions of existing units, such as the division of one foot into twelve equal inches. Inches were further divided into fractions by halves, into one-half inch, one-quarter inch, one-eighth inch and smaller divisions. For the purposes of this disclosure, fractional units are defined as this division of whole units by multiples of two, and will be specifically understood to include these units of half, quarter, eighth, and so forth.

As time has passed from those early days, so has the development of technology. Advances in technology requiring smaller, more durable, longer life devices have been accepted as commonplace, yet the foundation required for these advances is often misunderstood or taken for granted.

To manufacture smaller components, components at greater yield and lower prices, or components capable of special performance or reliability requires the ability to introduce precision into the tools, machines and processes that are used to produce the resulting components. These tools, machines and processes must have the same or better precision than that of the finished component. Yet, determining the precision of the tools, machines and processes requires the use of measuring devices capable of measuring widely diverse devices and objects. The measuring devices must, once again, have precision equal or greater than the precision required of the tools. The precision must start with the instruments used to measure other devices and objects.

In modern production, these measurements are often more precise than would be readily identified by fractions of an inch, even though many measurements are still specified based upon the fractional system. For example, a hole might be identified as having a one-half inch diameter, but precision may be specified to the nearest hundredth of an inch. Another dimension may be specified as having an outside diameter of 0.625 inches, which is five-eighths of an inch, with a tolerance of plus or minus five thousandths of an inch. These types of mixed fractional and decimal dimensions are commonplace in a manufacturing environment today.

Unfortunately, the development of instruments that readily measure and evaluate these fractional and decimal dimensions has not kept pace with the changing needs of the manufacturing environment. Calculators have been developed that will perform conversions between decimal and fractional formats. However, these calculators are not well suited to a manufacturing environment, and are prone to being destroyed by contamination, spills or accidental impact with tools, equipment or the shop floor. They must also be carried about to be of any real use on the shop floor, therefore requiring yet another pocket or pouch. Furthermore, the use of a separate device from the measuring instrument requires a separate step of keying information into the calculator, taking valuable time and introducing the possibility of keying errors. Since there is no direct visual feedback of proportions or relationships between the units of measure, these mistakes may easily go unnoticed until a later time, when the cost of the error is amplified by production of many bad parts.

In the prior art, measuring devices frequently have fairly well developed attachments which allow the measurement of a wide and diverse set of components. Typically, these measurements will include inside and outside diameters, elevations, thickness, gap and other similar measurements. Unfortunately, and in spite of their flexibility at measuring diverse components, these instruments are calibrated to either fractional or decimal measuring, but do not provide the ready ability to convert from one format to another.

U.S. Pat. No. 897,437 to Watson is representative of early versions of measuring instruments having both coarse and fine measurement which are capable of measuring a variety of dimensions. A straight rule is provided that has standard graduations marked thereon. Onto the rule there are clamped several arms which extend perpendicularly from the rule. These arms enable the measurement of diverse dimensions by allowing a part to be placed between the arms, to measure thickness or outside diameter, or allowing the arms to be placed within the part, such as for inside diameter. While these types of instruments have met with great success in the trade because of their tremendous versatility in taking measurements of many different types, several deficiencies are noteworthy. In particular, one or both of the adjustable arms cover a large number of graduations on the rule. Since most rules use larger and smaller marks to distinguish different graduations, covering up adjacent marks makes it much more difficult to discern quickly and accurately the particular graduation that is exposed. In addition, the precision of these devices is limited to the smaller sizes of graduations that may be placed upon the scale. While in theory a very large number of such graduations are possible, attempting to place them on the scale and still remain legible and useful is not practically possible. In practice, even scales divided to a sixteenth of an inch become visually "busy", and these finer scales require more time to accurately discern the measurement.

A second limitation is in the ability to quickly convert from fractions to decimals, such as when the part is specified by a combination of fractional and decimal units.

A third limitation arises from the fact that the alignment for measuring must occur between two perpendicular planes. The vertical edge of a movable body must be visually aligned with a horizontal graduation mark. Because the vertical edge and horizontal mark are not co-planar, and are furthermore not of similar width and dimension, accurate correlation between the two different structures is difficult. As a result, any precision beyond the usual sixteenth of an inch is increasingly difficult.

In order to overcome the human visual limitation of reading closely spaced graduations, vernier scales were developed such as disclosed by Homan in U.S. Pat. No. 1,602,490; Berger in U.S. Pat. No. 1,888,305; and Huffman in U.S. Pat. No. 1,888,597. The graduations on the vernier align with the main scale only at the appropriate fractional point of measurement. For example, in the decimal system of measurement, a vernier will divide into ten equal spaces the distance occupied by nine spaces on the scale. When the first vernier graduation mark aligns with a graduation mark on the main decimal scale, the vernier will indicate one-tenth the smallest main scale division. So, carrying this example further, if the main scale is divided into tenths of an inch, the vernier will be calibrated to identify hundredths of an inch without visually cluttering the main scale. This concept has also been widely adapted into the measuring instruments of the prior art, since they quickly advanced the resolution of these versatile instruments.

Alternatives to the vernier have been proposed, such as the sawtooth line of Clay in U.S. Pat. No. 4,607,436. However, these alternatives have not proven to offer sufficient benefit in reading the scale with precision for most applications. Furthermore, these scales are more difficult to produce with the intended accuracy.

There is a definite need to convert readily between fractional and decimal units, without the need for resorting to special calculators or extremely expensive and complicated devices. This need has not been fully realized by existing instruments.

SUMMARY OF THE INVENTION

In a first manifestation, the invention is an instrument for measuring distances. A rule is provided having primary fractional graduations and secondary graduations. An adjustable body which is movable with respect to the rule has vernier index graduations adjacent to the rule's fractional graduations for subdividing the rule. Alignment of one vernier index graduation with an adjacent rule fractional graduation designates a decimal division of the rule's fractional graduation into precise five-thousandths of a unit. Alignment of the second vernier index graduation with an adjacent rule fractional graduation designates a decimal division of the rule's fractional graduation into precise thousandths of a unit.

In a second manifestation, the invention is a method of measuring a first distance between a first point and a second point with a fractionally graduated rule and converting the distance measurement into a decimal distance measurement. The method comprises the steps of: determining an approximate measurement of the first distance; aligning a reference on a first movable member with a first whole unit graduation mark; spacing a reference on a second movable member from the first movable member reference by a precise distance standard; engaging the first point with the second movable reference; moving the first movable member reference relative to the rule to engage the second point with the first movable member; evaluating a first vernier to convert a first fractional distance to decimal distance with a resolution without interpolation of five-thousandths of a unit; evaluating a second vernier to convert a second fractional distance to decimal distance with a resolution without interpolation of one-thousandths of a unit; evaluating the rule and second movable member to determine a fractional distance between the first and second points in decimal form, with a resolution of one-eighth unit; and summing fractional distance, five-thousandths decimal distance, and one-thousandths decimal distance to yield a total decimal distance between first and second points in decimal form with a resolution of one-thousandth unit.

In a third manifestation, the invention is a tolerance gauge for determining whether a desired distance between a first point and a second point in a first direction defining a distance axis on a precision-machined component is within a predetermined maximum distance and a predetermined minimum distance. A rule extends longitudinally in a second direction which defines a rule axis and has at least one graduation thereon representative of the desired distance. A first member is fixed with respect to the rule for accurately locating the rule with respect to the first point. A second member accurately locates the second point relative to the rule by movement of the second member relative to the rule along the rule axis. First and second graduations, each fixed with respect to the second member, represent the predetermined maximum distance and predetermined minimum distance. The first and second graduations are oriented to align with the rule graduation at the predetermined maximum distance and predetermined minimum distance, respectively.

OBJECTS OF THE INVENTION

A first object of the invention is to provide a vernier for use with a common fractional rule which converts the fractional rule into decimal measurements. A further object of the invention is to provide decimal precision in thousandths of an inch from an eighth-inch rule scale. Another object of the invention is to provide the vernier as part of an assembly which adapts a standard rule to the measuring of many diverse dimensions. Yet another object of the invention is the provision of a vernier on the same plane as the rule graduations, which further only minimally or more preferably does not at all block the adjacent rule graduations. Another object of the invention is the provision of both fractional and decimal verniers on the same device, most preferably both co-planar with the standard rule. These and other objects of the invention are accomplished in the preferred and alternative embodiments, which will be best understood when considered with the accompanying drawings.

BRIEF DESCRIPTION OF THE DRAWINGS

FIG. 4a illustrates the exact alignment of a set of graduations of the first three embodiments, while

DESCRIPTION OF THE PREFERRED EMBODIMENTS

Figure 1:
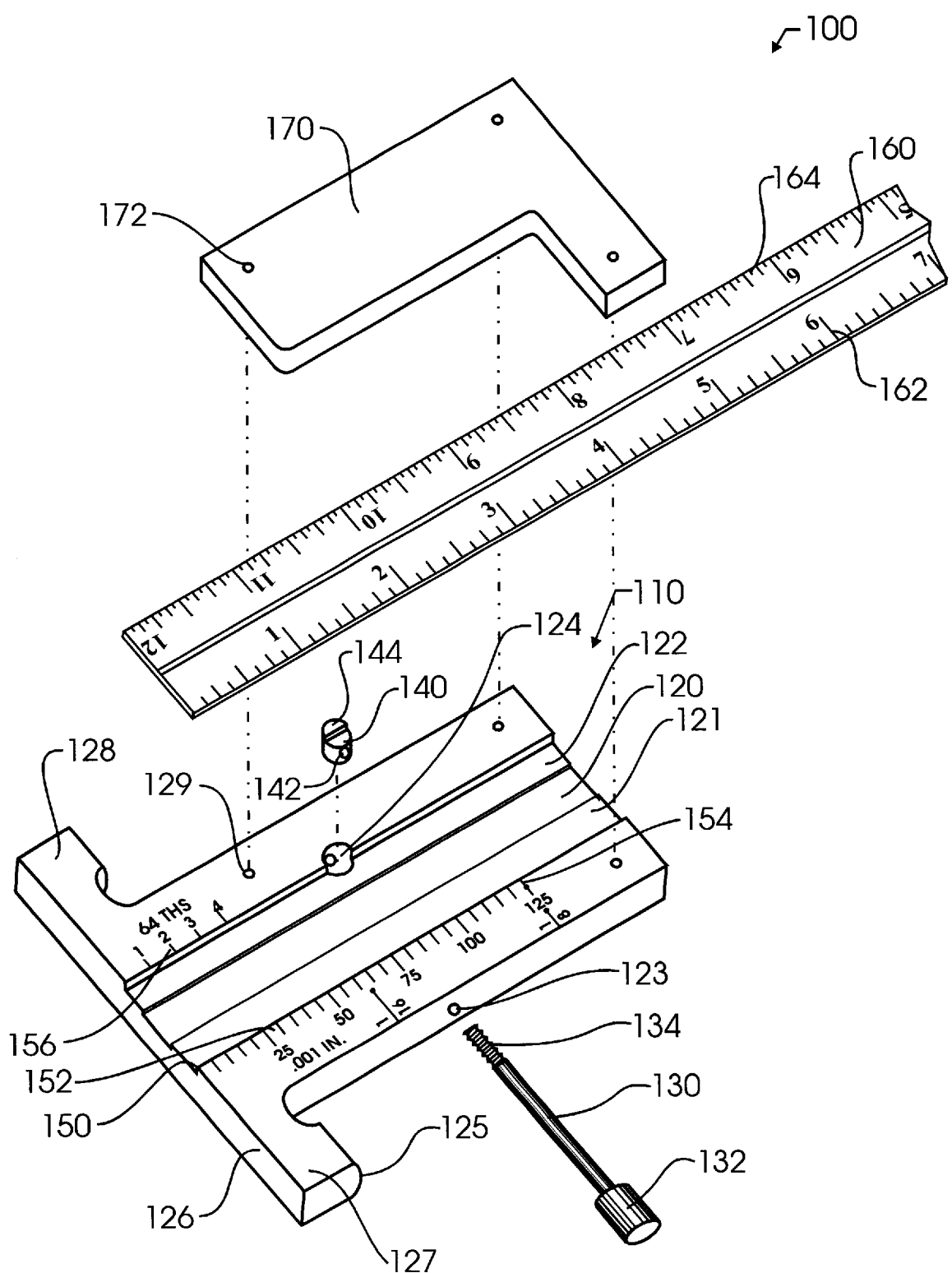
FIG. 1 illustrates a first embodiment of the invention by exploded assembly view.

FIG. 1 illustrates a first embodiment of the invention which incorporates the teachings of the invention into a compact, portable, rugged and versatile instrument 100 which finds utility in measuring a variety of dimensions. Instrument 100 has a base 110 which acts as a primary substrate about which other components may be assembled. Within base 110 is a longitudinal groove 120 having slightly elevated edges 121, 122. Groove 120 with edges 121, 122 acts as a receiver into which a standard rule 160 may be placed. The actual length of rule 160 is irrelevant to the invention, though a typical one-foot rule is shown in this illustration. By providing slight edges 121 and 122 within groove 120, rule 160 will be more securely held with less tendency towards wobble, in the event either rule 160 or base 110 are not perfectly planar. Base 110 additionally has a hole 123 extending transverse through body 120, and hole 123 passes through a perpendicular opening 124. Into hole 123 may be inserted a hand or thumb screw 130 having a small head 132 and threads 134. Into hole 124 a generally cylindrical rod 140 may be inserted. Rod 140 has a threaded hole 142 therein which is designed to mate with threads 134. In view of the cylindrical nature of hole 124 and rod 140, rod 140 will not be able to spin in the direction of thread rotation. Therefore, when thumb screw 130 is rotated, rod 140 will be drawn by threads 134 towards head 132. With rule 160 placed within groove 120, the small elevated region 144 of rod 140 will be drawn against edge 164 of rule 160, which will in turn push rule 160 towards vernier 152. Most preferably, vernier 152 will be slightly elevated at ends 150,154 thereon, ensuring a two point contact between vernier 152 and edge 162. By so designing the interface between rule 160 and body 120, several advantages may be attained. First, a three-point anchor is provided at region 144 and ends 150 and 154 which is very secure and free from wobbling which would otherwise make precise and repeatable measurements difficult or impossible. Second, surface graduation marks upon rule 160 are co-planar with surface graduation marks on body 110, making the comparison of marks much easier than was known in the prior art. Since graduation marks may be typically depressed slightly into the surface or alternatively raised therefrom, light reflecting from the differences in graduation mark elevation may be reflected and optically determined from rule to vernier, allowing a person to more easily visually determine alignment of marks to great precision.

Body 110 may further include various surfaces useful in measuring special dimensions or shapes, such as inside diameter or height measuring lip 125, arms such as arms 127 and 128, and an outside diameter or thickness or height measuring face 126. In addition, as shown in this embodiment, several different verniers 152 and 156 may be provided adjacent on opposite edges of rule 160, so that measurements may be taken in the standard fractional scale through vernier 156, or through the decimal vernier 152 which will be described in greater detail hereinbelow.

A cover 170 is preferably provided which serves as a fourth enclosing surface to help retain and guide rule 160 within groove 120. Cover 170 has holes 172 formed therein through which threaded or other fasteners may pass, preferably extending into threaded holes 129 within body 110. Cover 170 may take a variety of shapes, but most preferably the "L" shape illustrated in FIG. 1 offers significantly improved visibility to each of the verniers 152, 156. Cover 170 will not block graduation marks which may be needed to quickly ascertain a measurement, where, as aforementioned in the prior art, these adjacent marks were covered.

Figure 2:
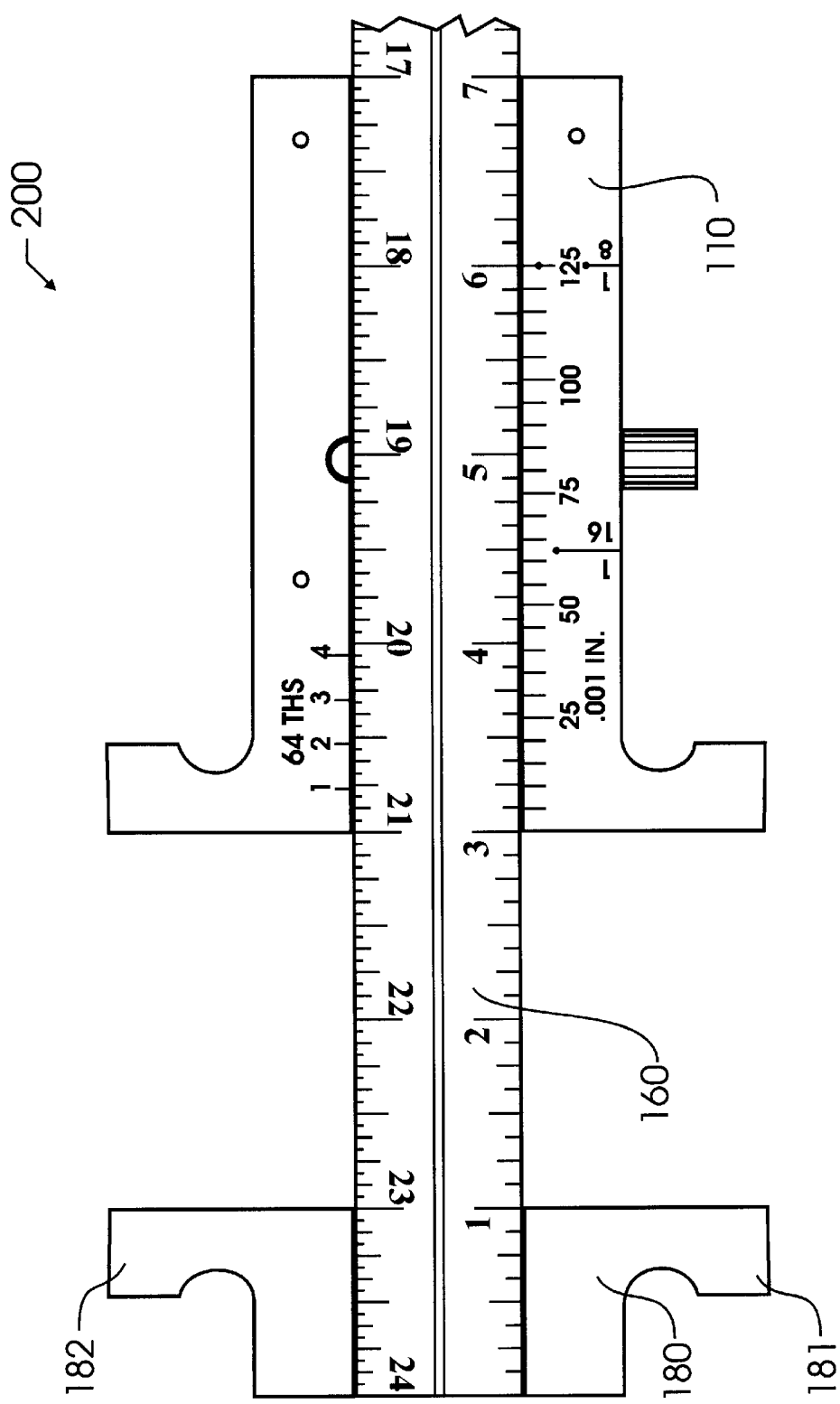
FIG. 2 illustrates a second embodiment of the invention by top plan view.

FIG. 2 illustrates an instrument 200 of similar embodiment to instrument 100 from a top plan view, with cover 170 removed therefrom. In the instrument 200, an additional arm structure 180 is provided at one end of guide rule 160. Arm structure 180 may be permanently affixed, or may be removable therefrom. In the most preferred construction of instrument 200, arm structure 180 is one-inch wide adjacent to rule 160. Furthermore, arms 181, 182 and 127, 128 are each exactly one-half inch wide. By so dimensioning the arms, an inside diameter measurement may be taken and read directly from rule side 162, using point 150 as the zero marker point. In other words, as shown by the position of body 110 in FIG. 2, an inside diameter measurement of this position would equal exactly three inches. An outside diameter measurement or thickness would equal one inch less, or exactly two inches. Those skilled in the art will readily recognize that other dimensions may be used. Nevertheless, these particular dimensions have been found to be most preferred.

Figure 3:
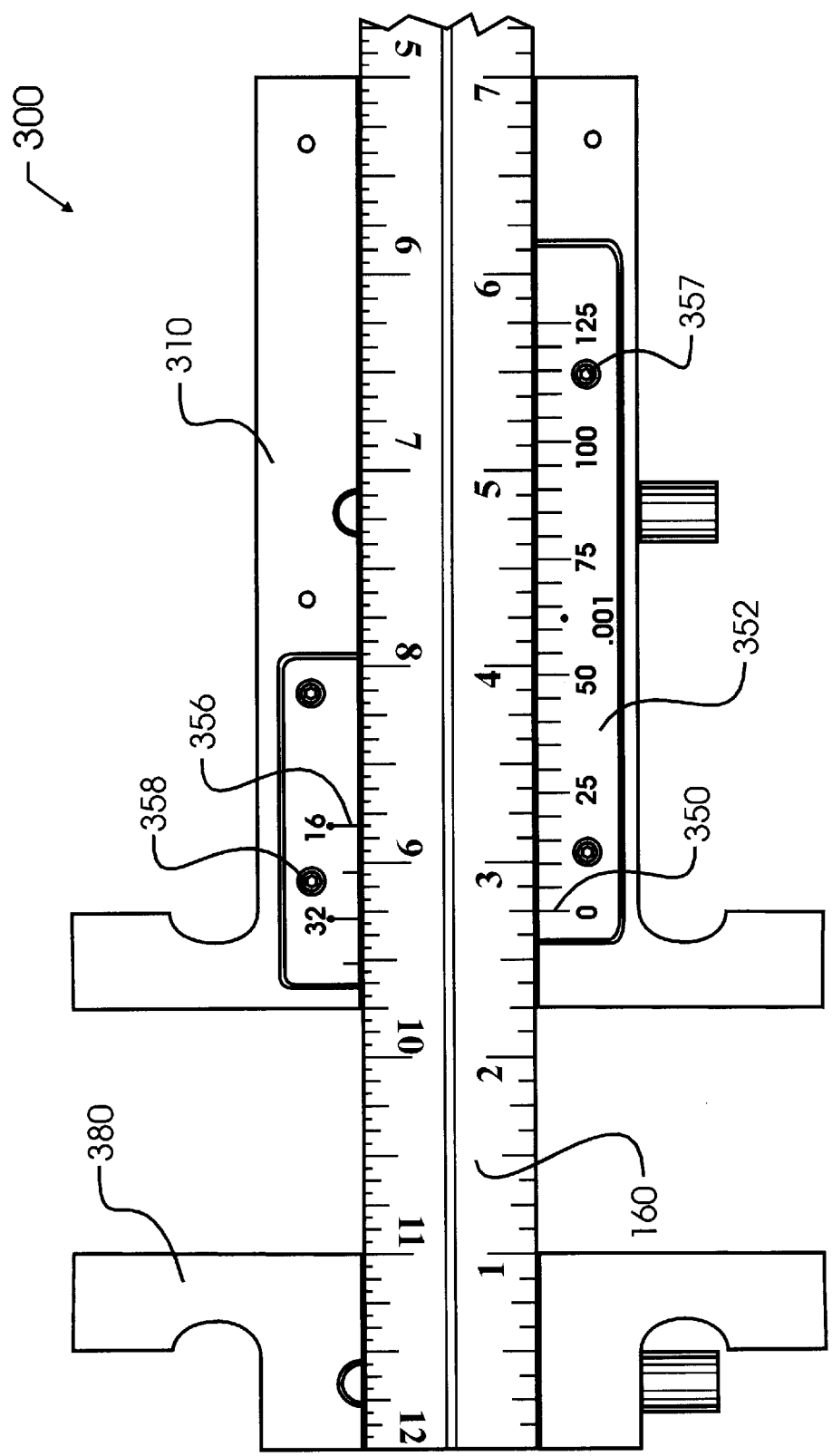
FIG. 3 illustrates a third embodiment of the invention by top plan view.

FIG. 3 illustrates a third embodiment of the invention which has special vernier inserts 352 and 356 which may be formed separately from body 310 and then attached thereto by, for illustration purposes, screws 357, 358. These separate verniers 352, 356 may be made very precisely, and separately from body 310, thereby saving the special treatments for only those components that truly require them. In the event of any distortions during heat treatment, the verniers 352, 356 may be adjusted by loosening screws 357 and 358 to ensure proper alignment with body 310. In practice, these verniers 352, 356 are most preferably exactly one-half inch offset from leading edge 126. This placement does not alter the operation of the vernier in any way.

Instruments 100, 200 and 300 each have a fractional vernier adjacent edge 164 of rule 160. This vernier is most preferred, but not essential. Adding this fractional vernier allows the single instrument to be used for more diverse measurements. Each instrument 100, 200, 300 also has a decimal vernier 152, 352 adjacent edge 162 of rule 160. This decimal vernier is formed by dividing three inches into twenty-five equal spaces. These spaces, center-to-center, are then equal to 0.120 inches. On the standard rule, the eighth-inch spacings are equal to 0.125 inches, which means that each vernier increment represents exactly 0.005 inches. This allows the fractional rule to be used to take measurements in thousandths of an inch. Furthermore, the eighth-inch graduations are readily converted by a table, which might, for example be printed directly on the back side of body 110, into the decimal equivalents of 0.125, 0.250, 0.375, 0.500, 0.626, 0.750, and 0.825 inches. By adding the correct numbers of 0.005 inches, based upon the vernier reading, to the decimal equivalent of the eighth-inch scale, an operator can readily determine measurements in thousandths units.

Figure 4A:
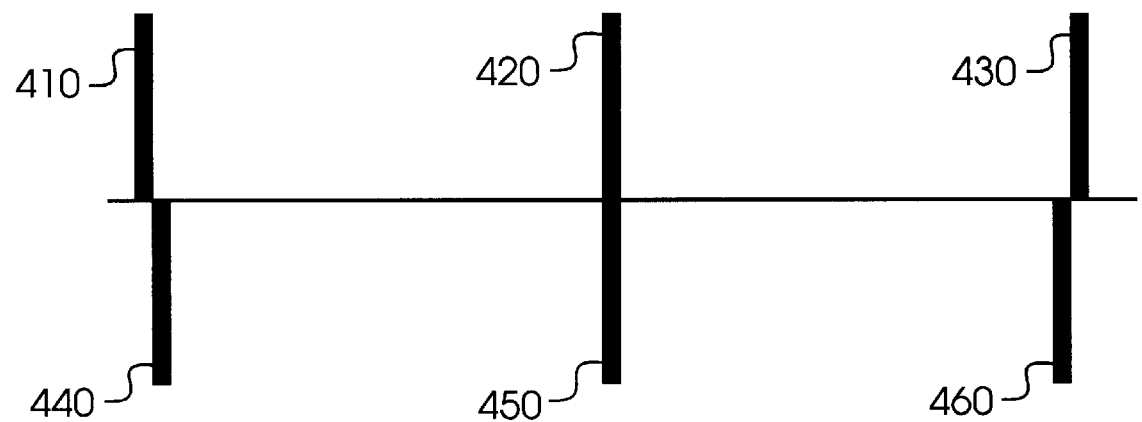
Figure 4B:
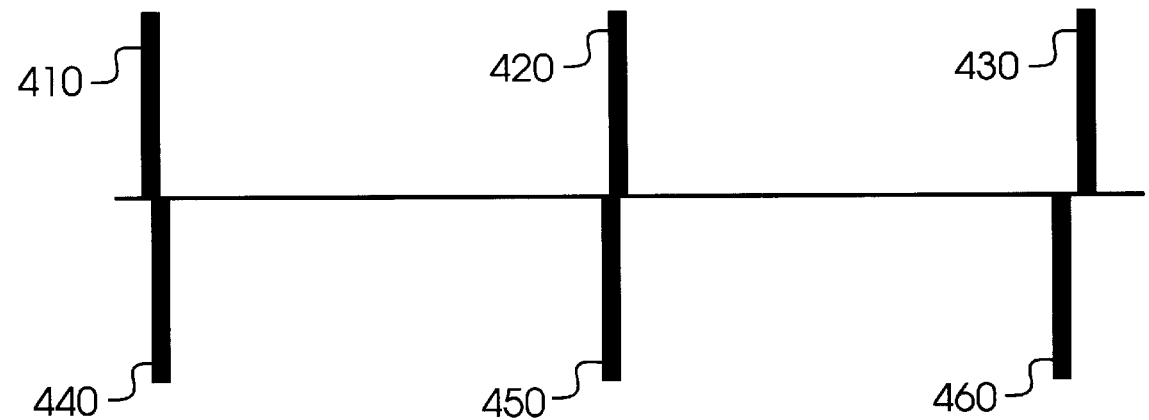
FIG. 4b illustrates interpolation which results from equidistant spacing between two adjacent graduations.

FIGS. 4a and 4b illustrate another feature of the preferred embodiment, wherein rule graduation marks 410, 420 and 420 are adjacent decimal vernier graduation marks 440, 450, 460. As shown in FIG. 4a, vernier mark 450 is aligned exactly with rule graduation 420. If each of the graduations on the rule and vernier are exactly 0.005 inches in width, the 0.120 inch center to center spacing between marks 440 and 450, when added to the 0.005 inches width of mark 440, will bring mark 440 just to the edge of mark 410, which is 0.125 inches on center from mark 420. As a result, the edges of marks 440 and 460 will align with the edges of marks 410, 430, as shown therein.

As can be seen in FIG. 4b, an interpolation feature is also possible when each of the graduation marks 410–460 are equal to the difference in center to center spacings between the rule and vernier. As seen therein, when none of the marks exactly align, but two adjacent marks are equidistant between vernier and rule, such as adjacent marks 410, 420 which are, in FIG. 4b equidistant to marks 440, 450 of the vernier scale, the actual vernier calculation is the average of the two adjacent marks. In other words, the actual vernier distance will be the sum of vernier amounts calculated for mark 440 and 450, the sum then divided by two. In effect, this allows relatively precise interpolation to 0.0025 inches with consistency.

Important is the process for determining the actual graduation mark width. The graduation marks are most preferably exactly equal to the difference in spacing between the vernier and the rule. As long as this is true, this phenomenon of FIG. 4 will then apply to other dimensions besides the eighth-inch rule and five-thousandths vernier of the preferred embodiment. Nevertheless, the eighth-inch unit is the only unit which converts to the desired thousandths precision, so this combination is the most preferred of the present invention.

Figure 5:
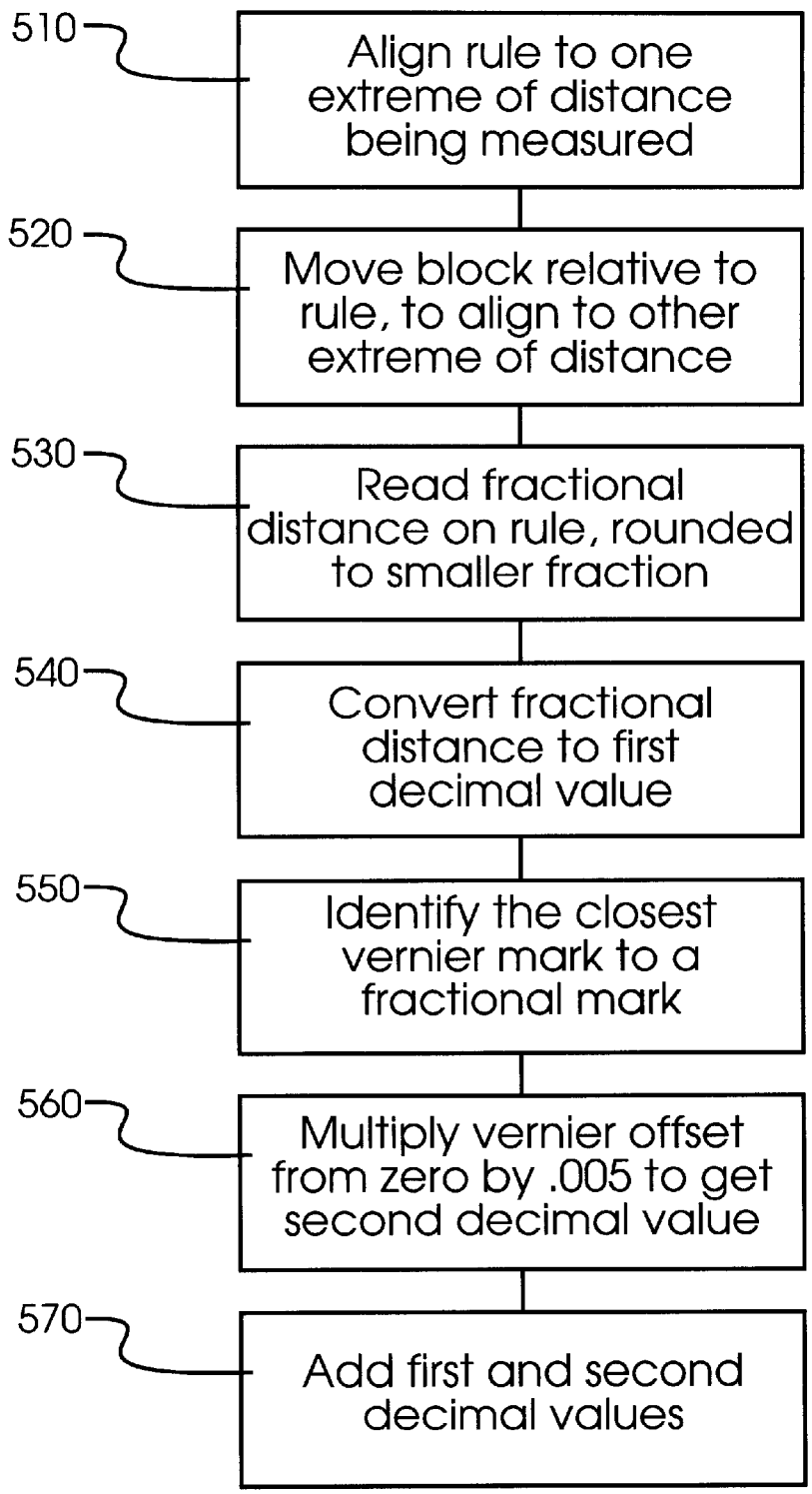
FIG. 5 illustrates a preferred method for conversion of fractional measurements to decimal values in accord with the present invention.

FIG. 5 illustrates by flow chart the process 500 of calculating the decimal vernier in more detail. Therein, the first step 510 is to position the rule relative to one extreme of the distance being measured. This is typically accomplished by placing either an end of the rule or arms such as arms 181, 182 against the first extreme edge to be measured. Next, in step 520, block 110 or 310 will be moved relative to rule 160 until the appropriate feature of the block is adjacent the other extreme edge to be measured. In step 530 the fractional rule is read, making sure that if a measurement is between two fractions, the smaller amount is used as the fractional amount. In other words, if the value is between one-eighth and one quarter of and inch, the one-eight inch value is the one that should be used. That fractional measurement, which will also include whole numbers for the total number of full inches, will be converted to a decimal value in step 540. This will most preferably be accomplished using a look-up table or chart for each of the seven discrete fractions, though other techniques may be used.

The next steps 550 and 560 are listed in sequential order following steps 530 and 540, but it is important to note that the actual order of these steps is not critical and that steps 550 and 560 could, in fact, come before steps 530 and 540. In steps 550 and 560, the vernier marks are compared to the rule fractional graduation marks to find the closest ones. Once that is done, an operator will count from the zero mark vernier graduation the number of vernier graduation marks to the closest mark. This number is multiplied in step 560 by 0.005 to calculate a second decimal value which represents the vernier offset from the fractional distance of step 530. Once that is done, the first decimal value of step 540 is added to the second decimal value of step 560, to obtain the full measured distance in decimal format. In the event two marks are equidistant at step 550, then the average of the two marks must be used to get an accurate measure, as was previously discussed in reference to FIG. 4b.

By placing the graduation marks upon the top surface of the rule and vernier, and keeping these marks closely adjacent, optical alignment and visual determination of precision approaching one-thousandth of an inch are viable. However, the inventors recognize that the principles of this feature of the invention, dividing a fractional rule with a decimal vernier, may be implemented by other methods besides optical and visual discrimination. Other methods may be considered by those skilled in the art, such as electrical or electromagnetic interpolations and digital displays, the use of microprocessors to perform the basic computations illustrated herein for the calculation of the actual distances, and so on. Nevertheless, the preferred embodiment offers the advantages of durability and simplicity, making this construction optimal for a harsh production environment.

Figure 6:
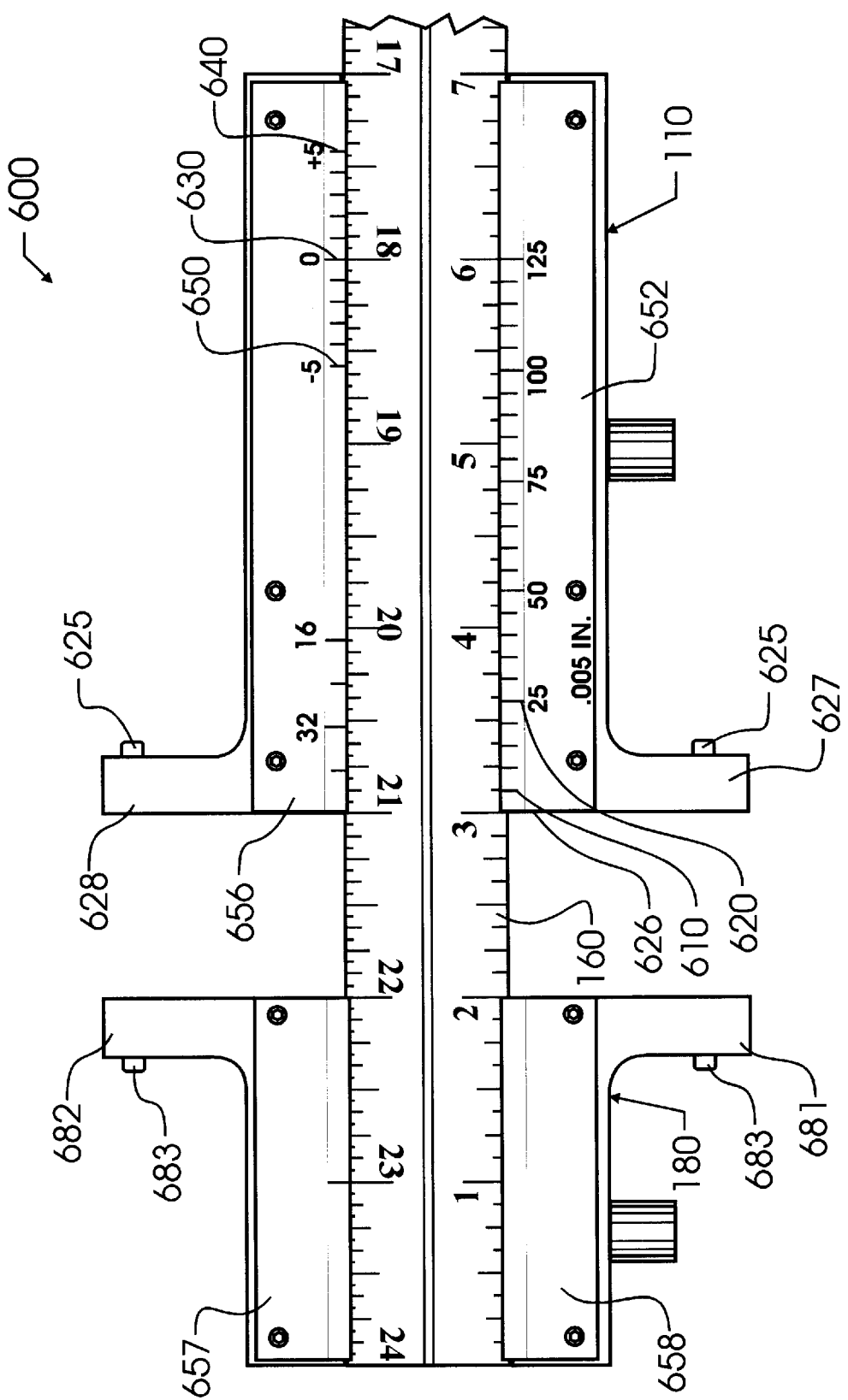
FIG. 6 illustrates a fourth embodiment of the invention by top plan view.

FIG. 6 illustrates a fourth embodiment instrument 600 which is capable of accurate resolution to one thousandth of an inch. Instrument 600 includes a base 110 into or onto which is attached a special hardened or heat-treated vernier 652. Rivets, screws or any other suitable fastening means may be employed to retain vernier 652 to base 110. Most preferably the attachment method allows precise placement or adjustment at the time of manufacture to ensure that vernier 652 is properly aligned with arm 110.

Vernier 652 is similar in arrangement and function to verniers 152, 352. However, vernier 652 illustrates an alternative construction which in this embodiment extends substantially from the measuring surface or zero-point 626 closest to arm structure 180 towards the opposite end of base 110. This allows vernier 652 to be manufactured separately from base 110, and enables base 110 to be manufactured at a somewhat lower cost. Further, vernier 652 then takes on a more regular geometry, further simplifying the process of marking or scribing the particular graduations, and thereby typically improving precision and lowering manufacturing costs. Additionally, and as will be described hereinbelow, the verniers are preferably interchangeable with differently marked verniers, allowing diverse applications for the same basic instrument.

Preferably, verniers 652 and 656 will be slightly offset from edge 626, for exemplary purposes by a small amount such as a few thousandths of an inch. This offset helps to prevent the vernier from being accidentally bumped out of proper alignment with base 110 during use. Also, the first mark is fairly difficult in production to position relative to the edge of the vernier, but all other marks are precise relative to the first mark. Consequently, removal of a small amount of material ensures that any imperfection in the distance between edge and first mark is eliminated from interfering with accurate measurement.

In instrument 600, several additional alternatives which differ from earlier described instruments are illustrated, including the use of specially treated measuring surfaces 625 and 683 extending from arms 627, 628, 681, and 682. These may preferably be slightly rounded or domed pins that are also specially hardened or heat treated to reduce any likelihood of deformation during use, though the geometry or material of these pins is not critical to the present invention. These pins may be cast, molded, pressed, threaded or otherwise affixed into arms 627, 628, 681, and 682. Most preferably, and similar to arms 181, 182, 127, 128, the spacing between these pins is predetermined and accurate, and also most preferably established at a simple fraction or decimal distance.

A second vernier 656 is provided parallel to vernier 652 but on a longitudinally extending edge of rule 160 opposite vernier 652. Vernier 656 is also affixed to base 110, typically using a similar method of attachment as with vernier 652 to help simplify the number of unique manufacturing processes. Onto vernier 656 are special graduation marks extending from mark 640 to mark 650, and including mark 630 therebetween. These graduation marks are designed to align with a predetermined fractional unit of measure on rule 160 at only one position within the range of graduations from mark 640 at a first end to mark 650 at a second end. In FIG. 6, which is only exemplary, graduation mark 630 aligns with the eighteen-inch graduation mark on rule 160. Preferably at consistent intervals, the additional marks from mark 640 to mark 650 are spaced to not quite align with a fractional unit present on rule 160. More specifically, and using the one-eighth inch markings of rule 160, the graduation marks from mark 640 to mark 650 will be spaced not the 0.125 inches of one-eighth of an inch, but instead only 0.124 inches. This way, any offset of from +0.005 to −0.005 inch, with resolution to one-thousandth of an inch, can be measured and observed. This can be added to or subtracted from the five-thousandths of an inch resolution measured using vernier 652.

It is noted that the selection of correspondence between the marks from mark 640 to mark 650 to the one-eighth inch graduation marks is not critical to the invention, and that there may instead be correspondence between any other fractions, or even decimals, on rule 160 and graduation marks on vernier 656. So, for exemplary purposes only, the marks from mark 640 to mark 650 may be spaced using quarter-inch correspondence, in which case the spacing between each adjacent mark from mark 640 to mark 650 would be 0.250 inches less one thousandth, or 0.249 inches. Similar calculations may be made for any other spacing or arrangement of markings that may be selected for rule 160. In addition, there is no limitation intended or implied on exactly how many marks will exist between marks 640 and 650, nor, therefore, on whether only one mark will align with a corresponding rule graduation. Furthermore, there are situations where the graduations will not all be equidistantly spaced. For example, and as will be better understood with relation to the description of FIG. 8, it is possible to provide a set of graduations spaced at the "increment less one thousandth" as above, and also provide several spaced at the increment less a different amount, such as five or ten thousandths, or even fractional increments. These additional graduations can then be used to expand the application of a single instrument to serve several diverse purposes, such as measurement and tolerance checks. The use of a total of eleven marks is one of convenience, since vernier 110 has resolution to five-thousandths of an inch. However, as few as five graduation marks will adequately resolve to one-thousandths of an inch. In the simplest use of this combination of five-thousandths vernier 652 and thousandths vernier 656, the measurement is calculated as described with reference to instruments 100 200, 300 to five thousandths. Then the vernier 656 is used to reach final resolution to thousandths simply by adding or subtracting thousandths from the five thousandths total, based upon where vernier 656 graduation marks from 640 to 650 align with rule 160 graduation marks.

Figure 8:
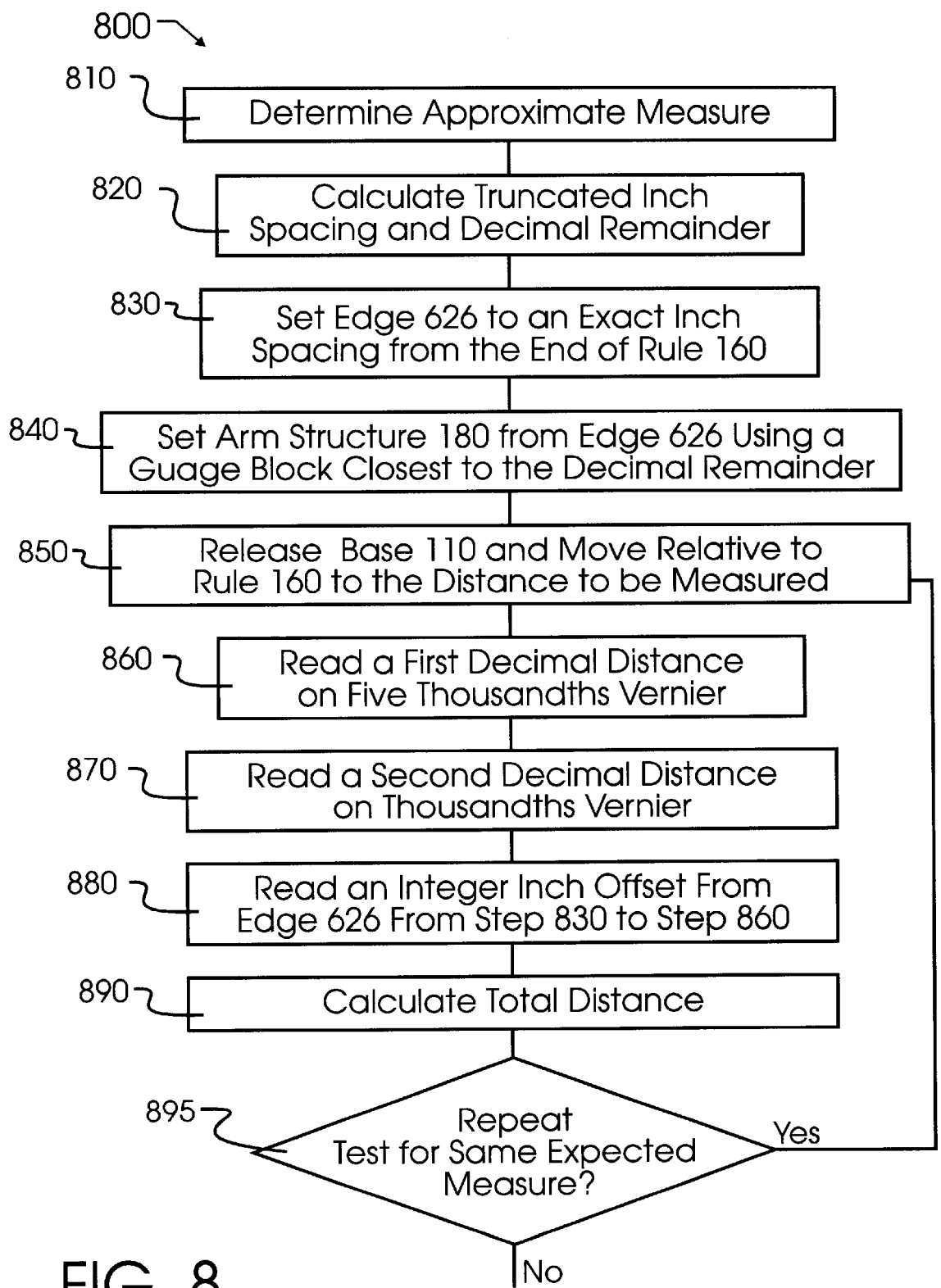
FIG. 8 illustrates an alternative method for conversion of fractional measurements to decimal values in accord with the present invention.

An alternative application of instrument 600 is illustrated in FIG. 8, which describes a method 800 for determining whether production tolerances have been met. Using method 800, both base 110 and arm structure 180 are preferably movable relative to rule 160. Step 810 involves determining an approximation for the measure to be taken or compared against. If there is a blueprint dimension or similar written dimensions to work from, these can be used directly from the print. Otherwise, the approximate measure can be taken with a rule such as rule 160 or with instrument 600, as desired. This approximate measure may, for example, be the intended dimension of a part to thousandths of an inch, or may instead be the actual measure, estimated to thousandths.

Using the approximate measure calculated in step 810, a truncated inch spacing and decimal remainder will be calculated in step 820. The truncated inch spacing is obtained by truncating the approximate measure to inches, by dropping off the tenths, hundredths and thousandths. The discarded tenths, hundredths and thousandths become the decimal remainder.

In step 830, edge 626 will be set to an inch spacing from the end of rule 160 which is preferably equal to or greater than the total displacement of arm structure 180. In the preferred embodiment, this is done by first aligning edge 626 to an inch graduation, and then verifying that the five thousandths vernier 652 and thousandths vernier 656 also confirm exact alignment. In an alternative embodiment, this may be done by releasing arm structure 180 and base 110 sufficiently from rule 160 that they each may slide longitudinally along rule 160. Rule 160 is then placed normal to a planar surface, and arm structure 180 and base 110 are slid towards the planar surface as far as possible. Next, base 110 may be locked against relative movement with rule 160. Preferably then, for this alternative embodiment step 830 to work as intended, arm structure 180 will occupy an even number of inches along the longitudinal length of rule 160, or, in the case of FIG. 6 exactly two inches. Base 110, after locking, will most preferably exactly align so that the edge 626 aligns with the inch graduation marking on rule 160, such as the two-inch graduation in FIG. 6, and the 0.125 marking on vernier 652 aligns exactly with the five-inch graduation, and graduation 630 aligns with the nineteen-inch marking. It is very important at this step 830 that the user accurately set base 110 relative to rule 160 at this time. As noted however, in one embodiment this accurate setting of base 110 will simply entail releasing both base 110 and arm structure 180 to slide against a planar surface from which rule 160 extends in a normal (perpendicular) direction, and then locking base 110 against further movement. However, this alternative approach may be less desirable in some instances, since the precision of the instrument is subject to the possibility o grit on the planar surface, and production tolerances on arm structure 180 that may make precise dimensions much more difficult or expensive.

In step 840, a gauge block thickness standard closest to the decimal remainder is selected, and placed between edge 626 and arm structure 180, and then arm structure 180 is locked into place relative to rule 160. The selection of a dimension for the gauge block is done based upon the availability of thickness standards to the desired decimal. In other words, if the approximate measure of step 810 is 1.750 inches, then the decimal remainder would be 0.750 inches. If the user possessed a gauge block that was exactly 0.750 inches, which is most preferred, then arm structure 180 will be separated from edge 626 by the 0.750 inch standard and then locked into place. Standard sizes that differ from the decimal remainder may be used as well, but less preferably as will become apparent herein below.

In step 850, base 110 is released to move relative to rule 160, and is spaced from arm structure 180 by the amount of the distance to be measured. This will typically be done by releasing base 110, and then using instrument 600 to measure a part in the typical way, such as by inserting the part between edge 626 and the closest surface of arm structure 180. In step 860, the five-thousandths vernier 652 will be read, and in step 870 the thousandths vernier 656 will be read. In step 880, the integer inch offset from edge 626 in step 830 to the position of edge 626 in step 860 is determined.

If arm structure 180 was set using a gauge block thickness standard that was exactly equal to the decimal remainder, the integer inch offset determined in step 880 should equal the truncated inch spacing calculated in step 820. If not, the final part is off by more than one inch from the approximate measure. Typically, in a production environment, determining whether this number matches will not be done since a visual inspection will normally identify a full inch defect. If the standard is exactly equal to the decimal remainder, then the edge 626 will align directly with an inch graduation on rule 160, and graduation 630 will be very close to or aligned with an inch graduation also. If the part is within five thousandths of an inch, one of the graduation markings between mark 640 and mark 650 will align, and edge 626 or either the next graduation mark (the 0.005 graduation mark) or the 0.120 graduation mark on vernier 652 will align best with the one-eighth inch graduations on rule 160.

If the standard does not exactly equal the decimal remainder, then the user will have to calculate the anticipated additional offset, and read the verniers 652, 656 and rule 160 accordingly, to confirm the anticipated placement of each vernier 652, 656 with respect to rule 160. While this approach still works, the review of the offset is slightly more complex and also thereby slightly more prone to being misread.

When used to repeatedly determine tolerances of a single production part, instrument 600 may be "preset" by steps 810–840. Then, for each part to be tested, steps 850–890 will be conducted. Each time a subsequent part is to be tested, steps 850–890 may again be repeated without having to reset or recalibrate in steps 810–840. This simplified testing of multiple parts having the same intended dimensions is shown by answering yes to question 895 in FIG. 8, which returns the user to step 850 for each additional part to be tested.

It should now be apparent that by using this method 800, and once steps 810–840 have been completed to preset instrument 600, a user can quickly determine whether each part is within 0.005 inches of tolerance by simply looking at edge 626 to confirm that the closest mark to edge 626 is the correct inch graduation mark, next confirming that either edge 626 or the 0.005 or 0.120 graduations are closest, and then confirming that one of graduation marks 640 to 650 align with the corresponding marks on rule 160. If the tolerance window is desired to be greater than the ten thousandths illustrated for instrument 600, the numbers of marks between 640 and 650, with each offset from the associated graduation mark of rule 160 equaling an additional one-thousandth of an inch, can be increased, thereby also increasing the total distance between mark 640 and mark 650. For example, while the illustration of FIG. 6 shows there to be eleven total marks spanning 1.24 inches from mark 640 to mark 650, thereby permitting a window of plus or minus five thousandths, it would be possible to extend the scale to include twenty-one marks spanning 2.28 inches permitting a window of plus or minus ten thousandths. Furthermore, the distance spanned between marks 640 and 650 is only determined by what fraction or decimal of an inch the marks are selected to correspond to on rule 160, so the same twenty-one marks would, for example, span only 1.23 inches if the marks were created to correspond to the one-sixteenth inch graduations on rule 160, instead of the one-eighth inch graduations shown in FIG. 6.

Figure 7:
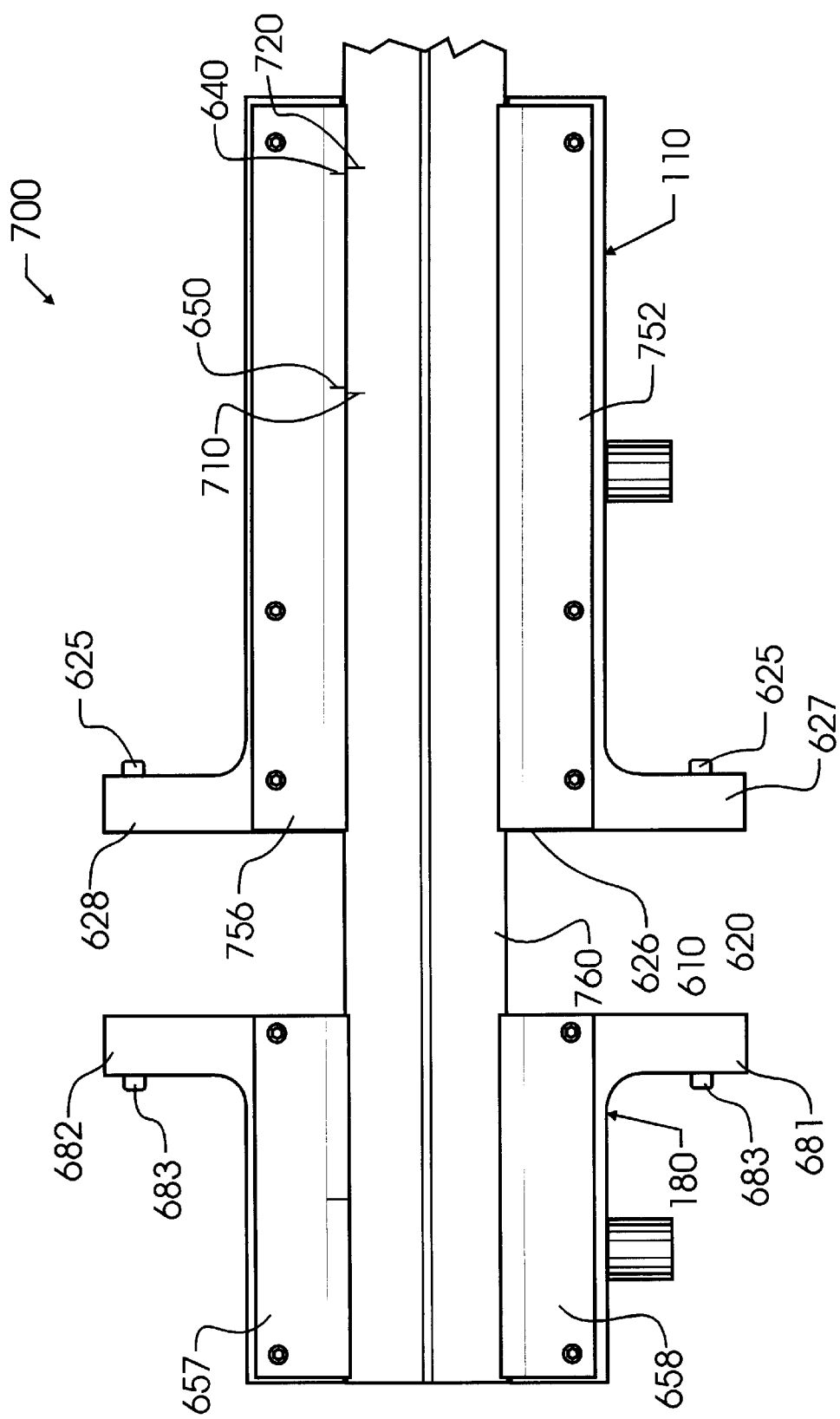
FIG. 7 illustrates a fifth embodiment of the invention by top plan view.

While instrument 600 offers a great deal of versatility in taking accurate measures to thousandths of an inch and also in performing quality control or tolerance checks as illustrated in method 800, there are times where all of the graduation marks are unnecessary, and a single instrument will be dedicated solely to tolerance testing of a single part. In those instances, an instrument such as instrument 700 shown in FIG. 7 may be preferred, owing to reduced cost and greater ease of use. In such a case, steps 810–840 are performed prior to instrument 700 being provided to the user, and the only markings on rule 160 that are necessary will be marks 710 and 720, which correspond to marks 640, 650 of vernier 756. While not essential to the performance of the invention, it is conceivable that arm structure 180 could be permanently fixed in position relative to rule 760 after initial preset or calibration, or not be adjustable at all.

When a part is checked for tolerance using instrument 700, and also following the examples of FIG. 6 as shown therein and described herein above, if the part has a plus or minus five thousandths of an inch tolerance, then lines 640 and 650 must both stay within the limits which are set by lines 710, 720, just as would have been the case with relation to instrument 600. Anything else would constitute a part out of tolerance. Other verniers 657, 658, 752 may be optionally provided, and other graduation markings similar to marks 710, 720 may be provided on rule 760 as desired. For example, marks 710, 720 may be used to determine the tolerance of one particular dimension in association with marks 640, 650, but a part may have several critical dimensions or several different parts may desirably be checked using instrument 700. In these instances, additional markings similar to marks 640, 650, 710, 720 may be provided. This allows for some compromise between the simplicity of instrument 700 and the flexibility of instrument 600.

In addition, while dual marks 640, 650 on vernier 756 are illustrated, the use of a single mark is contemplated as well, using the single mark to represent the desired distance of measurement, and marks 710, 720 then establishing limits of travel from the single mark to remain within tolerance or specification.

In yet another alternative embodiment, the uses for standard base 110 and arm structure 180 may be expanded without having to replace base 110 and arm structure 180. In this manifestation, different verniers may be added to or removed from base 110 and arm structure 180, similar to the replacement of verniers 652, 656 with verniers 752, 756 of FIG. 7. The changing of verniers allows a single base structure to be used in the taking measurements or alternative testing for tolerance in a "go-no go" manner, simply by changing out the verniers or the verniers and rule.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. An instrument for measuring distances comprising:

a rule having a whole unit scale;

primary fractional graduations dividing said whole units by multiples of two into halves, quarters and eighths;

secondary graduations dividing said rule;

an adjustable body which is movable with respect to said rule;

first vernier index graduations affixed to said adjustable body adjacent to said primary fractional graduations for subdividing said primary fractional graduations into equal first vernier index graduations, said first vernier index graduations, when added to a decimal equivalent of said primary fractional graduations, dividing said whole units into precise five-thousandths of said whole units;

second vernier index graduations affixed to said adjustable body adjacent to said secondary rule graduations for subdividing said secondary rule graduations into equal second vernier index graduations, said second vernier index graduations further dividing said first vernier index graduations into precise one-thousandths of said whole units;

wherein alignment of one of said first vernier index graduations with an adjacent primary fractional graduation designates a decimal division of said primary fractional graduation into five-thousandths of said whole units without interpolation and alignment of one of said second vernier index graduations with an adjacent secondary graduation designates one-thousandths of said whole units of measurement without interpolation.

2. The instrument for measuring distances of claim 1 wherein each one of said primary fractional graduations represent a space equal to one-eighth of an inch from adjacent graduations.

3. The instrument for measuring distances of claim 1 wherein said rule is a standard straight-edge rule, and said adjustable body is removable therefrom.

4. The instrument for measuring distances of claim 3 wherein said rule is divided into one-eighth of an inch graduations.

5. The instrument for measuring distances of claim 3 wherein said first index vernier graduations and second vernier index graduations are removable from said adjustable body.

6. The instrument for measuring distances of claim 5 further comprising tolerance vernier graduations that represent maximum and minimum distances.

7. The instrument for measuring distances of claim 5 wherein said tolerance vernier graduations replace said first index vernier graduations and second vernier index graduations, thereby converting said measuring instrument into a tolerance gauge.

8. A method of measuring a first distance between a first point and a second point with a fractionally graduated rule having a whole unit scale and primary fractional graduations dividing said whole units by multiples of two into halves, quarters and eighths and converting said distance measurement into a decimal distance measurement that divides said whole unit scale into tenths, hundredths and thousandths, with resolution to one thousandth without interpolation, comprising the steps of determining an approximate measurement of said first distance;

aligning a reference on a first movable member with a first whole unit graduation mark;

spacing a reference on a second movable member from said first movable member reference by a precise distance standard;

engaging said first point with said second movable reference;

moving said first movable member reference relative to said rule and said second movable member reference to engage said second point with said first movable member;

evaluating a first vernier to convert a first fractional distance to decimal distance with a resolution without interpolation of five-thousandths of a unit;

evaluating a second vernier to convert a second fractional distance to decimal distance with a resolution without interpolation of one-thousandths of a unit;

evaluating said rule and said second movable member to determine a fractional distance between said first and second point in decimal form, with a resolution of one-eighth unit; and summing said fractional distance between said first and second point, said five-thousandths decimal distance, and said one-thousandths decimal distance to yield a total decimal distance between said first and second points in decimal form with a resolution of one-thousandth unit.

9. The method of claim 8 comprising the further steps of:

calculating a decimal remainder from said approximate measurement; and using said decimal remainder as the precise distance of said precise distance standard in said spacing step.

10. The method of claim 8 wherein said precise distance standard has a precise distance of less than one whole unit.

11. The method of claim 8 further comprising the steps of:

specifying a maximum acceptable distance between said first point and said second point;

specifying a minimum acceptable distance between said first point and said second point;

removing said second vernier; and installing a third vernier having at least one graduation marking between said maximum acceptable distance and said minimum acceptable distance; and providing at least a two graduation markings cooperative with said third vernier, a first of said at least two graduation markings establishing said maximum acceptable distance when aligned with said at least one graduation marking and a second of said at least two graduation markings establishing said minimum acceptable distance when aligned with said at least one graduation marking.

12. A tolerance gauge for determining whether a desired distance between a first point and a second point in a first direction defining a distance axis on a precision-machined component is within a predetermined maximum distance and a predetermined minimum distance, comprising:

a rule extending longitudinally in a second direction which defines a rule axis, said rule having at least one graduation thereon representative of said desired distance;

a first member fixed with respect to said rule for accurately locating said rule with respect to said first point;

a second member for accurately locating said second point with respect to said rule by moving said second member relative to said rule along said rule axis;

a first and a second graduation, each fixed with respect to said second member representative of said predetermined maximum distance and said predetermined minimum distance, respectively;

said first and second graduations oriented to align with said at least one rule graduation at said predetermined maximum distance and said predetermined minimum distance, respectively.

13. The tolerance gauge of claim 12 further comprising a first vernier plate exchangeable with said first and second graduations having a plurality of first vernier plate graduation marks which cooperate with said at least one rule graduation to align ones of said at least one rule graduation to ones of said first vernier plate graduation marks and to thereby indicate five-thousandth units.

14. The tolerance gauge of claim 13 further comprising a second vernier plate adjacent said at least on rule graduation and having thereon a plurality of graduation marks which cooperate with said at least one rule graduation to align ones of said at least one rule graduation to ones of said second vernier plate graduation marks to indicate thousandth units.

15. The tolerance gauge of claim 12 wherein said distance axis and said rule axis are parallel.

16. The tolerance gauge of claim 15 wherein said distance axis and said rule axis are the same axis.

* * * * *